July 10, 1928.
E. L. DELANY
1,676,430
FLUSH VALVE FLOAT FOR FLUSH TANKS
Filed Sept. 29, 1925    2 Sheets-Sheet 1
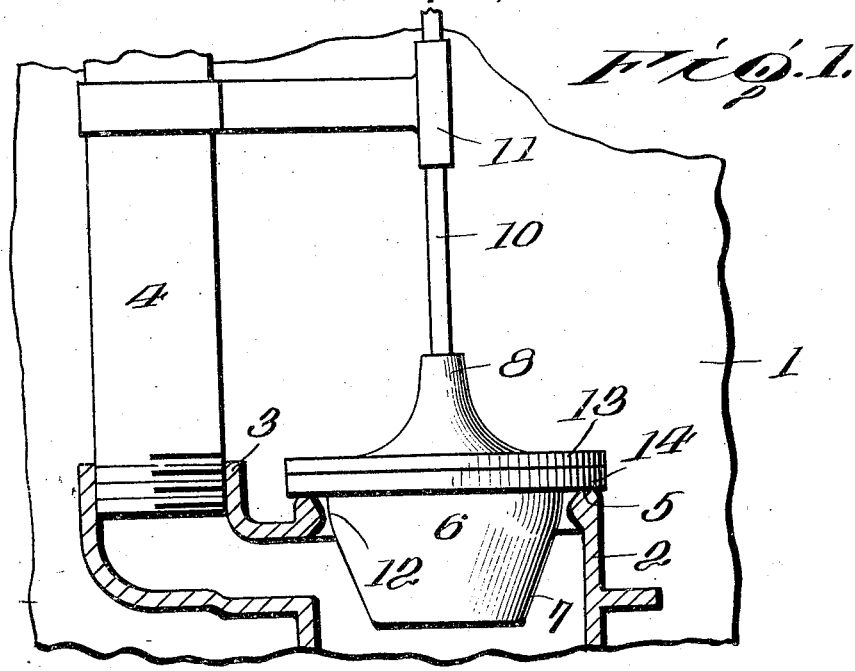
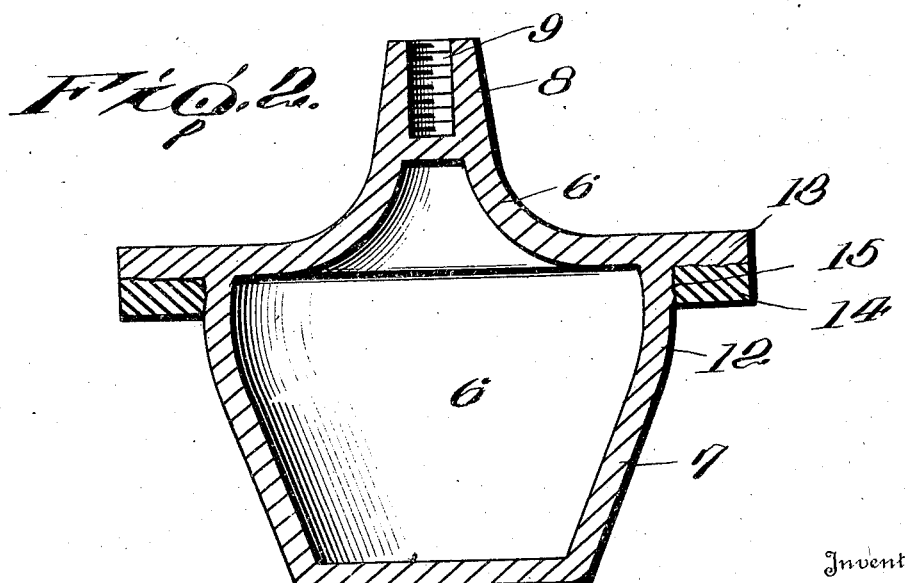
Inventor
E. L. Delany.
By
Attorney

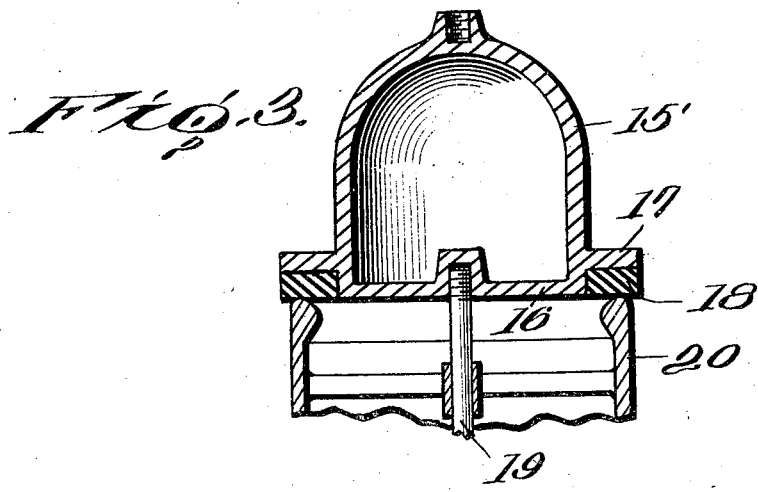
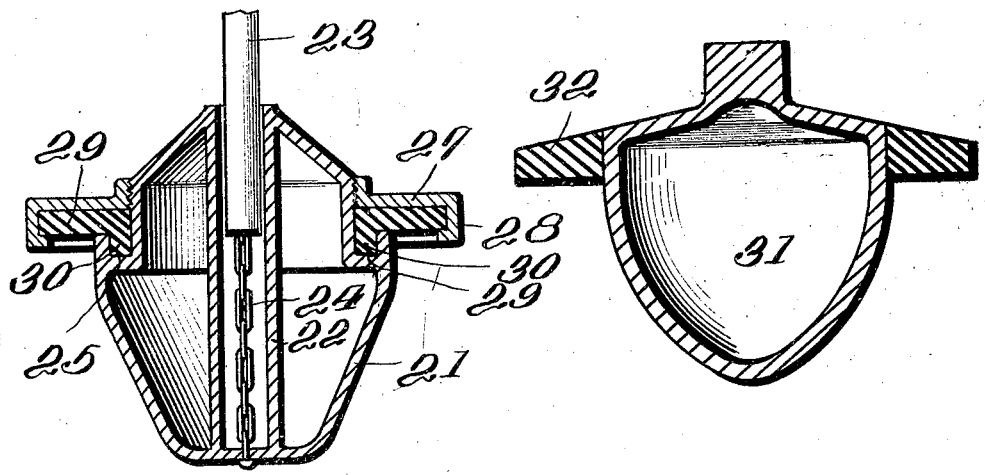

Patented July 10, 1928.

1,676,430

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

FLUSH-VALVE FLOAT FOR FLUSH TANKS.

Application filed September 29, 1925. Serial No. 59,368.

My invention relates to improvements in flush valve floats for flush tanks.

The object of my invention is to provide a hard rubber flush valve float for flush tanks or other purposes, in which the same is made of hard rubber, whereby the operating rod may be attached and provided with a soft horizontal portion adapted to cooperate with the seat so that a smaller seating surface is provided, and thus insure a perfect seating of the valve to prevent leakage of water therearound.

Another object of my invention is to provide a flush valve float of this character in which means is provided for readily and securely attaching a soft rubber seating surface thereto.

A further object of my invention is to provide a simple, cheap and effective flush ball of this character having certain details of structure and combination of parts hereinafter more fully set forth.

In the accompanying drawings:—

Figure 1 is a vertical sectional view of the discharge pipe and the flush tank showing my improved flush valve float seated thereon.

Figure 2 is an enlarged sectional view of my improved flush valve float.

Figure 3 is an enlarged vertical sectional view of a modified form of flush valve float.

Figure 4 is a vertical sectional view of another modified form of flush valve float.

Figure 5 is a vertical sectional view of a still further modified form of flush valve float.

Referring now to the drawings, 1 represents the flush tank and 2 the discharge pipe therefrom, which is provided with the usual by-pass 3, to which is connected the pipe 4, leading up into the tank and forms an overflow in the event that the inlet valve does not properly close. The discharge pipe 2 is provided with an annular valve seat 5, of a curved form adapted to cooperate with my improved flush valve float ball which I will now proceed to describe. The flush ball 6, as shown in Figure 2 of the drawings is preferably of the form shown, having the slightly conical shaped portion 7, so as to form a guide, whereby the flush float ball is guided down into the discharge pipe 2, due to the suction therein caused by the discharge of water therethrough. The flush float ball as shown, is made of hard rubber and has its upper end provided with the upwardly extending nipple 8 having a screw threaded opening 9 having screwed therein the operating rod 10 which extends upwardly and passes through a guide 11, supported by the pipe 4.

The conical shaped portion 7 terminates at its upper end into the curved portion 12 which has at its upper end an outwardly extending annular flange 13, extending a considerable distance outwardly and to the lower face of which is vulcanized an annular gasket 14 of soft rubber, and whereby the same is rigidly held by the flush ball. The inner edge 15 of the gasket 14 could also be vulcanized to the body of the flush ball, although this is not necesssary.

By this structure it will be seen that I have produced a hard rubber flush valve float for flush tanks in which a horizontal annular soft rubber seating surface is provided, adapted to cooperate with the seat of the discharge pipe 2, whereby the seat of the flush valve float is adapted to seat itself and entirely cut off the flow of water from the discharge pipe. By this arrangement it will be seen that a very small seating surface is provided which lessens the liability of any dirt on the seat from preventing the flush valve float from properly seating itself and cutting off the flow of water through the discharge pipe.

In the modification shown in Figure 3, the flush valve float 15', like the preferred form, is made of hard rubber, but has its lower end flat as indicated at 16, and provided with the annular flange 17 carrying the soft rubber gasket 18. In this form the lifting rod 19 is attached to the lower flat face and extends through the flush pipe 20.

In the modification shown in Figure 4, the flush valve float 21 is provided with a central opening 22 therethrough, and the lifting rod 23 has a chain connection 24 with the float. In this form the flush valve float is provided with an annular groove 25 having its outer periphery 26 threaded above the groove and upon which is screwed the hard rubber ring 27 having a flange 28 supporting the soft rubber gasket 29, and said soft rubber gasket 29 having a downwardly extending flange 30 resting upon the groove 25. By this structure it will be seen that I have provided means whereby the soft rubber gasket 29 may be replaced at any time.

In the modification shown in Figure 5 the flush valve float 31 is of the general form shown in Figure 2 of the drawings and is provided with a horizontal soft rubber flange 32 which may be formed integral with the flush valve float or made of a separate part, vulcanized or otherwise secured thereto.

While I have shown this applied to a flush tank it will be understood that the same could be used in many other places.

Having thus fully described my invention what I claim is:

1. A flush valve float comprising a hollow body portion of hard rubber having a horizontal annular flange, and a seating surface vulcanized to the lower face of said flange.

2. A flush valve float comprising a hollow hard rubber body portion having its upper end provided with a threaded recess to receive the operating rod and its lower end shaped to guide the same between the valve seat, a horizontal integral flange carried by the body portion, and a soft rubber seating surface vulcanized to the lower face of said flange.

In testimony whereof, I have signed this specification.

EDWARD L. DELANY.